US006770216B2

(12) United States Patent
Takahashi et al.

(10) Patent No.: US 6,770,216 B2
(45) Date of Patent: Aug. 3, 2004

(54) METHOD FOR PRODUCING TITANIUM-CONTAINING AQUEOUS SOLUTIONS

(75) Inventors: Yasutaka Takahashi, Gifu (JP); Yutaka Oya, Gifu (JP); Takayuki Ban, Gifu (JP)

(73) Assignee: Gifu University, Gifu (JP)

( * ) Notice: Subject to any disclaimer, the term of this patent is extended or adjusted under 35 U.S.C. 154(b) by 118 days.

(21) Appl. No.: 09/852,279

(22) Filed: May 10, 2001

(65) Prior Publication Data

US 2002/0000532 A1 Jan. 3, 2002

(51) Int. Cl.$^7$ ................................................. C09K 3/00
(52) U.S. Cl. ........................................ 252/1; 423/659
(58) Field of Search ............................. 252/1; 423/659

(56) References Cited

U.S. PATENT DOCUMENTS

| | | | |
|---|---|---|---|
| 4,282,208 A | * | 8/1981 | Young et al. ............... 424/486 |
| 4,585,821 A | * | 4/1986 | Progneaux et al. ......... 524/425 |
| 4,610,974 A | * | 9/1986 | Speca ........................ 502/113 |
| 4,694,025 A | * | 9/1987 | Park ........................... 521/88 |
| 4,732,750 A | | 3/1988 | Olson et al. | |

FOREIGN PATENT DOCUMENTS

| | | |
|---|---|---|
| JP | 01-133939 A | 5/1989 |
| JP | 09/124576 | 5/1997 |
| JP | 11/049518 | 2/1999 |
| JP | 11-292537 A | 10/1999 |
| JP | 11/339398 | 12/1999 |
| JP | 2000/222919 | 8/2000 |

OTHER PUBLICATIONS

Tyzor®–Organic Titiantes, Dupont, Aqueous Chelates Tyzor LA. Tyzor 131 and pp. 1–5, Date unknown.*

* cited by examiner

*Primary Examiner*—Cephia D. Toomer
(74) *Attorney, Agent, or Firm*—Burns, Doane, Swecker & Mathis, L.L.P.

(57) ABSTRACT

A method is disclosed for producing a titanium-containing aqueous solution by reacting a titanium alkoxide with water in the presence of at least one of ammonia, and amines selected from a primary amine, a secondary amine, and a tertiary amine, provided that when ammonia and/or the primary amine only is used, at least one selected from the group consisting of an α-diketone, a β-diketone, an α hydroxyketone and a carboxylic acid is used in combination.

4 Claims, 1 Drawing Sheet

METHOD FOR PRODUCING TITANIUM-CONTAINING AQUEOUS SOLUTIONS

Figure 1:
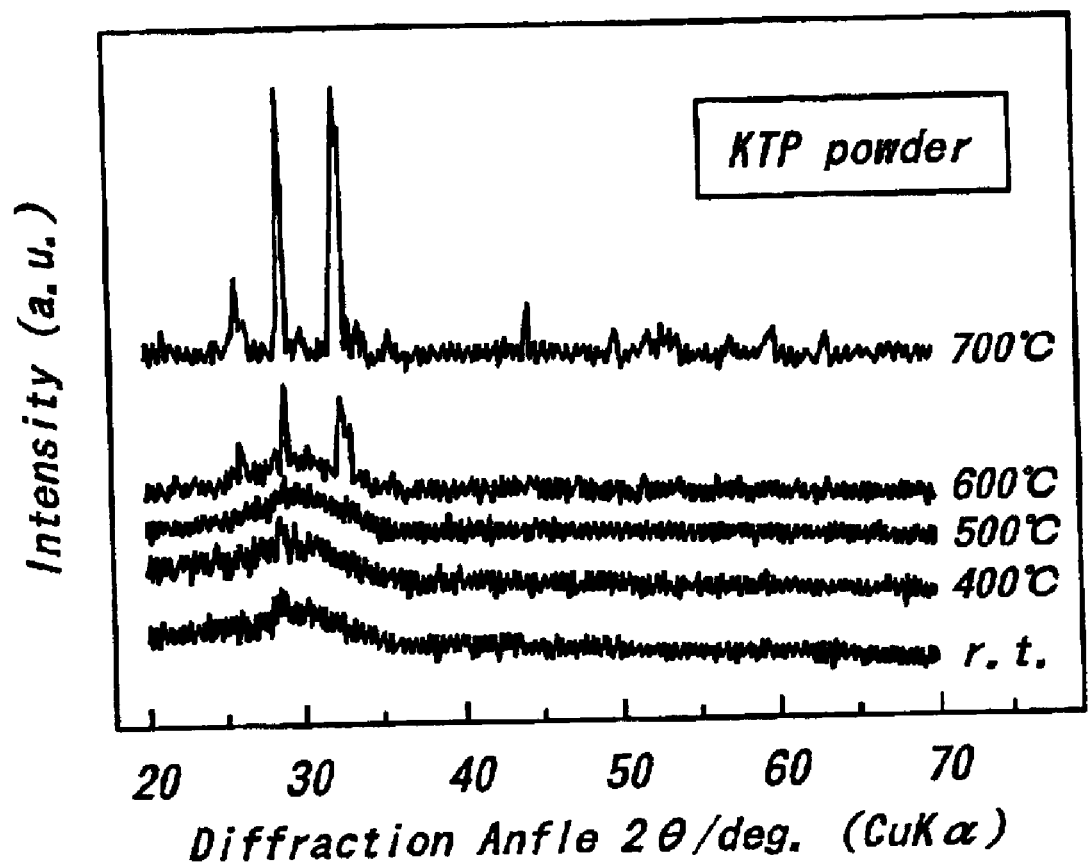

BACKGROUND OF THE INVENTION (1) Field of the Invention

The present invention relates to a method for producing an aqueous solution containing a metal at a high concentration, particularly to a method for producing an aqueous solution containing titanium at a high concentration by using at least one of ammonia, primary, and secondary and tertiary amines.

(2) Description of the Related Art

It is known that solutions containing titanium are produced by dissolving titanium alkoxides into various organic solvents such as alcohols or hydrocarbons. The solutions produced by such a method are being used for producing photocatalyst and dielectric thin films of composite oxides.

There are known peroxytitanium aqueous solution prepared by a reaction between so-called titanic acid obtained through hydrolysis of titanium tetrachloride or a titanium alkoxide and hydrogen peroxide or a reaction among metallic titanium, hydrogen peroxide, ammonia water and hydroxycarboxylic acid. Particularly, the complex obtained by the latter reaction is known as "TAS FINE" (commercial name).

However, since the alkoxide has a high reactivity with water, the titanium-containing solution obtained by using one of the above organic solvents needs to be prevented from contacting with moisture in air during the synthesis. The resulting aqueous solution is unstable with water, so that it must be prevented from contacting moisture during storage. Furthermore, since the organic solvent used is inflammable, attention needs to be paid to fire. Since the organic solvent is used, the solution may ignite through heat generation during the hydrolysis.

Further, such a solution is not suitable as a starting material for composite oxides containing alkali ions or alkaline earth metal ions (for example, barium titanate or potassium titanyl phosphate (KTP)). Since titanium compounds are unstable with water, most of them are used together with solvents having high environmental loads, such as organic solvents. However, the above-mentioned problem still exists. Investigations have been earnestly made to remove as much environmental load-increasing factors as possible from steps in the production and also to cause no pollution. How to use factors causing low environmental loads is a problem.

The above problem can be solved by converting the titanium compound to an aqueous solution. However, there is a tendency that an aqueous solution having ions with high positive valency (+4 or more) easily causes aqua-complex ions to be hydrolyzed and condensed, and generally causes precipitation of a basic oxide thereof. The titanium ion is one of typical ions exhibiting such a behavior. Therefore, the titanium-containing aqueous solution is not obtained unless a highly acidic condition is applied.

The above-mentioned peroxytitanium solution is known as only one example. However, this solution has the drawbacks that it contains chlorine even if the concentrations are low when titanium tetrachloride was used as the starting material and/or the concentration of titanium contained in the aqueous solution is low unless stabilized by a suitable chelating agent. The concentrated solutions may contain a hydroxycarboxylate as a ligand, for example. Therefore, an aqueous solution containing titanium at a high concentration is desired, which contains simple titanic acid ions only and does not cause gellation or precipitation over a long time period. Since the solution proposed in this invention, does not contain a complicated ligand with a large molecular weight, it is an optimum starting material for the synthesis of derivatives from titanic acid. However, such a titanium-containing aqueous solution or its preparation method has not been known.

SUMMARY OF THE INVENTION

It is an object of the present invention to provide an aqueous solution containing titanium at a high concentration, with excellent homogeneity and stability over an extended time of period.

In order to realize the above object, the present inventors reacted titanium alkoxides with water in the presence of amines, etc. As a result, the inventors discovered the method for producing the titanium-containing aqueous solution according to the present invention.

The method for producing the titanium-containing aqueous solutions according to the present invention is characterized by reacting a titanium alkoxide with water in the presence of at least one of ammonia, and amines selected from a primary amine, a secondary amine, and a tertiary amine (hereinafter, these are also referred to "amines, etc." or "amines or the like", provided that when ammonia and/or the primary amine only is used, at least one selected from the group consisting of an α-diketone, a β-diketone, an α hydroxyketone and a carboxylic acid is used in combination.

As a preferred embodiment of the method for producing the titanium-containing aqueous solutions according to the present invention, the amines, etc. comprise at least one selected from the group consisting of N-methyldiethanolamine, N-ethyldiethanolamine, diisopropanolamine, triethanolamine, dimethylamine, trimethylamine, diethylamine, and triethylamine.

As another preferred embodiment of the method for producing the titanium-containing aqueous solutions according to the present invention, the reaction is carried out in the presence of the ketone or the like.

The "ketone or the like" include at least one selected from the group consisting of an α-diketone, a β-diketone, an α hydroxyketone and a carboxylic acid.

BRIEF DESCRIPTION OF THE INVENTION

For a better understanding of the invention, reference is made to the attached drawing, wherein:

FIG. 1 is a graph showing an XRD (X-ray diffraction) pattern of a KTP powder obtained from one of the aqueous solutions.

DETAILED DESCRIPTION OF THE INVENTION

In the method for producing the titanium-containing aqueous solutions according to the present invention, at least one of ammonia, and amines selected from the group consisting of a primary amine, a secondary amine and a tertiary amine is used. The amines are compounds in which one or more hydrogen atoms of ammonia was (were) replaced by one or more hydrocarbon residues R, and are classified into primary amines $RNH_2$, secondary amines $RR'NH$, and tertiary amines $RR'R''H$, depending upon the number of the substitutent(s) on the nitrogen atoms. The amines, etc. used in the present invention include ammonia in addition to the above amines.

Since a stable titanium-containing aqueous solution was obtained in the presence of the amines, etc. and the ketones, etc., it was at first, presumed that a remarkable effect of a mixed system of the amine, etc. and the ketone, etc. was attributable to the formation of an imine product having a structure like diethanolamine (DEA) functioning as a multidentate ligand-chelating ligand. However, ammonia or N,N-dimethylethanolamine (DMEA) cannot form such a compound, but ammonia and DMEA are compounds highly effective in obtaining the stable titanium-containing aqueous solution. Particularly, the latter is a N, N-dimethyl derivative of monoethanolamine (MEA), so that it does not form an imine with a ketone. This result strongly suggests that the amine used exhibited some unexpected effect.

Titanium ion in water exists usually in the form of an aqua-complex which is strongly hydrolyzed and condensed to titanate ions $Ti_nO_m^{-2(m-2n)}$. Therefore, it is considered that in this system, the amines, etc. function not as a ligand bonding to titanium but as a base, and they form alkylammonium cations and hydroxide anions via the following hydrolysis formula.

$R_3N+H_2O \ldots >R_3NH^+ + OH^-$ wherein R is a hydrogen atom, an alkyl group or a hydroxyalkyl group, provided that R's may be identical or different, and at least one of $R_3$ is not hydrogen atom. Therefore, the amines, etc. promote the formation of an alkylammonium titanate salt including a titanium oxide cluster unit having a composition of $Ti_nO_m^{-2(m-2n)}$ at an anion site.

The reason why the alkyl amines are used in the method of producing the titanium-containing aqueous solution according to the present invention is that the alkyl ammonium ions are considered to be so large in size that they can not be intercalated in the titanate anions which may have a layered structure. If intercalated, they would form a precipitate.

The amines are not particularly limited, but they are preferably strongly basic. Further, amines having larger molecular weights tend to be preferred as compared with those having smaller molecular weights.

As the alkanol amines, secondary and tertiary alkanol amines may preferably be recited. For example, N-methyldiethanolamine, N-ethyldiethanolamine, diisopropanolamine, and triethanolamine may be recited as the alkanolamine.

As the alkylamines, the secondary and tertiary amines may be preferably recited. More concretely, dimethylamine, trimethylamine, diethylamine and triethylamine may be recited as the alkylamine.

In the present invention, the titanium alkoxide is reacted with water in the presence of at least one of ammonia and the amines as mentioned above. The titanium alkoxide (Ti(OR)$_4$) means an alkolate complex between titanium and an alcoholate (RO$^-$) which is formed by removing a proton from a hydroxyl group of an alcohol (ROH). The titanium alkoxide is not particularly limited, but titanium ethoxide, titanium butoxides, titanium propoxides, their acethylacetone derivatives, etc. may be recited. From the standpoint of general availability and easy handling, titanium isoproxide may be preferably recited as the titanium alkoxide.

The reaction temperature is not particularly limited, and the reaction may be carried out at room temperature. The reaction may be carried out by mixing the titanium alkoxide with the above amine or the like, and then adding water thereto. The mixing ratio of the amine or the like to the titanium alkoxide depends upon the kinds of the amine or the like and the titanium alkoxide, and is not particularly limited. Preferably, the amine or the like: titanium alkoxide=0.5 to 5:1. More preferably, the amine or the like: titanium alkoxide=0.5 to 2:1

Water may be in such an amount as required for a finally necessary concentration of titanium. The amount of water, which depends upon the kinds of the amine or the like and the tatanium alkoxide, is not particularly limited. Water may be 5 to 50 times, preferably 10 to 15 times as much as the mixed liquid between the amine or the like and the titanium alkoxide.

As mentioned above, the titanium-containing aqueous solutions may be obtained by using the amine or the like only. In the present invention, the above reaction may be carried out further in the presence of the ketone or the like. Particularly when it is difficult to obtain the titanium-containing aqueous solutions with the amines or the like alone or when the aqueous solution has a short stabilization time period, it is effective to further add a ketone or a carboxylic acid.

The ketone generally refers to compounds represented by RR'C=O. In the present invention, the ketone is not particularly limited, but ketones having a hydroxyl group are preferred. Because, the ketone can chelate-coordinate with titanium by this hydroxyl group, stabilizing titanate ions.

More specifically, at least one selected from the group consisting of α-diketones, β-diketones, α-hydroxylketones, and carboxylic acids may be recited as the ketones and the like.

The mixed amount of the ketone and/or the carboxylic acid, which does not depend upon the kinds of the amines or the like and the titanium alkoxide, is not particularly limited. The mixed ratio between the amines or the like: the ketone or the like is preferably 100:1 to 500, more preferably 100:30 to 200, and most preferably 100 to 50 to 150.

The ratio of the titanium alkoxide to the ketone or the like is preferably 100:1 to 500, more preferably 100: 30 to 200, most preferably 100: 50 to 150.

EXAMPLES

Hereinafter, embodiments of the present invention are given in the following examples, but the invention is never limited to these examples.

Example 1

Alkylamine series

Triethylamine, 1.39 ml (0.01 mol), was added to titanium isopropoxide (hereinafter referred to as TIP) 2.9 ml(0.01 mol) at room temperature. The mixture became a solution having a low viscosity with no color change. Immediately after a small amount of pure water was added to the solution, a white solid was produced. This solid was slowly dissolved after the addition of total 15.7 ml of water, which gave a light yellow transparent solution. This solution contained about 0.5 M concentration of titanium. It maintained a uniform solution state for a long time period (about a half year), and did not cause gellation or precipitation. Isopropanol produced by the hydrolysis of TIP can be distilled off under reduced pressure, which would not influence the stability. A diethylamine solution could be prepared in the same manner. The trimethylamine became turbid after the addition of water, but the precipitate was gradually dissolved. The precipitate was dissolved within one month, giving a uniform solution. Results are shown in Table 1.

TABLE 1

| System | Additive | pH | R (stab./Ti) | Appearance | pH | Conc. (M) |
|---|---|---|---|---|---|---|
| Aklylamine | Dimethylamine | 11.5 | (1)2 | ◎ | 11.0 | 0.5 |
| | Diethylamine | — | 1 | ◎ | — | 0.5 |
| | Trimethylamine | — | 2 | ◎ | — | 0.5 |
| | Triethylamine | 12.6 | 1 | ◎ | 11.7 | 0.5 |

◎: Transparent solution

Example 2
Alkanolamine series

Triethanolamine 1.39 ml (0.01 mol), was added to TIP 2.9 ml (0.01 mol) at room temperature. The mixture became a transparent solution having a high viscosity with no color change. When 5.8 ml of pure water was added to the solution, a colorless solution was produced. This solution contained about 1.0 M concentration of titanium, and maintained a uniform solution state (about one month). Even once the solution was gelled, the gel was dissolved again by further adding pure water, so that the solution having a 0.5 M concentration of titanium could be prepared and be stored for a long time period.

Solutions containing methyldiethanolamine, ethyldiethanolamine or diisopropanolamine could be obtained in the same manner. Results are shown in Table 2.

TABLE 2

| System | Additive | pH | R (stab./Ti) | Appearance | pH | Conc. (M) |
|---|---|---|---|---|---|---|
| Alkanolamine | MDEA | 11.3 | 1 | ◎ | 10.3 | 0.5 |
| | EDEA | — | 1 | ◎ | 10.5 | 0.5 |
| | DIPA | — | 1 | ◎ | 10.5 | 0.5 |
| | TEA | — | 1 | ◎ | 9.6 | 0.5 |

◎: Transparent solution
MDEA: N-melhyldiethanolamine
EDEA: N-ethyldiethanolamine
DIPA: Diisopropanolamine
TEA: Triethanolamine Example 3
Monoethanolamine-α-hydroxyketone mixed series Monoethanolamine 0.60 ml (0.01 mol) and acetoin 0.87 ml (0.01 mol) were added at room temperature to TIP 2.9 ml (0.01 mol) purified by distillation under reduced pressure. The solution immediately changed its color to a dark reddish blown and the viscosity became higher. When 15.8 ml of pure water was added to the solution, the reddish blown solution formed. This solution contained about 1.0 M concentration of titanium, and maintained a uniform solution state (about a half year) free from gellation and precipitation. Isopropanol produced by the hydrolysis of TIP could be distilled off under reduced pressure, but the stability did not change even after that.

Monoethanolamine-acetol, diethylethanolamine-acetoin, dimethyl-ethanolamine-acetol, and diethanolamine-acetol mixed solutions could be prepared in the same manner. Results are shown in Table 3.

TABLE 3

| System | Additive | pH | R (stab./Ti) | Appearance | pH | Conc. (M) |
|---|---|---|---|---|---|---|
| α-hydroxyketone-ethanol amine | acetol-MEA | 11.3 | 1 | ◎ | 10.4 | 0.5 |
| | acetoin-MEA | — | 1 | ◎ | 9.9 | 1.0 |
| | acetol-DMEA | — | 1 | ◎ | 9.9 | 0.5 |
| | acetoin-DMEA | — | 1 | ◎ | 9.7 | 0.5 |
| | acetol-DEA | — | 1 | ◎ | — | 0.5 |
| | acetoin-DEA | — | 1 | ◎ | — | 0.5 |

◎: Transparent solution
DEA: diethanolamine,
MEA: monoethanolamine,
DMEA: N,N-dimethyletianolamine Example 4

α-hydroxyketone-amine mixed solutions

Acetoin 0.87 g (0.01 mol) and hydrazine hydrate was added to TIP 2.9 ml (0.01 mol) at room temperature. The mixture became a light yellow transparent solution with heat generation. The addition of 15.2 ml of pure water to the solution did not cause precipitation or gellation. This solution contained about 0.5 M concentration of titanium, and maintained a uniform solution state for a long time period (about a half year).

Acetol-hydrazine (1:1, 0.02 mol), acetol-ammonia (1:1, 0.02 mol), and acetol (0.02 mol)-triethylenetetramine (0.01 mol)-based stable titanium-containing solutions could be obtained in the same manner. Results were shown in Table 4.

TABLE 4

| System | Additive | pH | R (stab./Ti) | Appearance | pH | Conc. (M) |
|---|---|---|---|---|---|---|
| Ketone amine series | acetol-NH$_3$ | — | 2 | ◉ | 10.2 | 0.5 |
| | acetoin-hydrazine | — | 1 | ◉ | 8.6 | 0.5 |
| | acetol-hydrazine | — | 2 | ◉ | 8.9 | 0.5 |
| | acetol-trien (2-1) | — | 1 | ◉ | 10.6 | 0.5 |
| | acetoin-trien (2-1) | — | 1 | ◉ | 10.6 | 0.5 |
| | acetoin-HMT | — | 1 | ◉ | 6.3 | 0.5 |

◉: Transparent solution
trien: triethylenetetramine,
HMT: hexamethylenetetramine Comparative Examples As comparative Examples, acetoin 0.87 ml (0.01 mol), was added to TIP 2.9 ml (0.01 mol) at room temperature. When pure water was added while its amount was varied in a range of 10 to 20 ml, gellation or precipitation occurred. This is considered to mean that only the ketone or the like could not reduce electrostatic attraction forces between ions, suppress excess poly-condensation of titanic acid ions, or maintain the stability of the titanium aqueous solution. No aqueous solutions using only ketones were prepared, and results are shown in Table 5.

TABLE 5

| System | Additive | pH | R (stab./Ti) | Appearance | pH | Conc. (M) |
|---|---|---|---|---|---|---|
| α-diketone | diacetol | — | 2 | X | 2.7 | 0.5 |
| β-diketone | acetylacetone | 6.1 | 2 | X | 4.2 | 0.5 |
| α-hydroxy acetone | acetol | 2.7 | 2 | X | 2.9 | 0.5 |
| | acetoin | 2.9 | 2 | X | 2.8 | 0.5 |
| Carboxylic acid | acetic acid | — | 2 | X | — | 0.5 |
| Hydrogen peroxide | hydrogen peroxide | — | 2 | X | — | 0.5 |

◉: Transparent solution,
X: precipitated or gelled

Example 5
Preparation of mixed oxides

Simple water-soluble compounds could be almost freely added to titanium-containing solutions. Therefore, some starting materials for titanium-mixed oxides can be very easily prepared by using such titanium-containing aqueous solutions. KTP (KTiOPO$_4$) is one of typical examples.

KTP is a useful material having a non-linear optical effect. However, since potassium phosphate, which is one of such starting materials, is ordinarily insoluble in alcohol medium, it is difficult to prepare the KTP solution by a sol-gel method, unless suitably modified.

FIG. 1 shows an XRD (X-ray diffraction) pattern of a KTP powder obtained from an aqueous solution. It revealed that the powder began to crystallize at about 500° C. and good crystals were obtained at 700° C. Every peak observed was representative of the diffractions of KTP. No peak representative of TiO$_2$ was detected, which showed that the titanium-containing aqueous solution was effective for the preparation of the mixed oxide material containing titanium.

The method for producing the titanium-containing aqueous solutions according to the present invention has the advantageous effect that the solution can be easily prepared by reacting a titanium alkoxide with water in the presence of at least one of ammonia, and amines selected from a primary amine, a secondary amine, and a tertiary amine, provided that when ammonia and/or the primary amine only is used, a at least one selected from the group consisting of an α-diketone, a β-diketone, an α hydroxyketone and a carboxylic acid is used in combination. For example, the titanium-containing aqueous solutions can be easily prepared from titanium isopropoxide by adding a secondary amine or a tertiary amine and diluting the resulting with an appropriate amount of water.

The aqueous solutions obtained according to the producing method of the present invention have another advantage that the solutions are useful for the preparation of titanium-mixed oxide materials containing elements which salts are soluble in water.

The producing method according to the present invention exhibits a further advantageous effect that the stable titanium-containing aqueous solution at a high concentration can be obtained.

Furthermore, since the producing method according to the present invention can offer the titanium aqueous solutions without using an organic solvent at all in the producing steps, the invention method has a still further advantageous effect that the starting material for the synthesis of the titanium oxides can be obtained with a very small environmental load.

What is claimed is:

1. A method for producing a titanium-containing aqueous solution, comprising reacting a titanium alkoxide with water in the presence of at least one of ammonia, and amines selected from a primary amine, a secondary amine, and a tertiary amine, wherein the titanium-containing aqueous solution contains titanic acid ions.

2. The method set forth in claim 1, wherein the amines comprise at least one of methyldiethanolamine, ethyldiethanolamine, diisopropanolamine, triethanolamine, dimethylamine, trimethylamine, diethylamine, and triethylamine.

3. The method set forth in claim 1, wherein said reaction is carried out in the presence of at least one selected from the group consisting of an α-diketone, a β-diketone, an α-hydroxyketone and a carboxylic acid.

4. The method set forth in claim 1, wherein the reaction is carried out in the presence of at least one selected from the group consisting of an α-diketone, a β-diketone, an α hydroxyketone and a carboxylic acid when ammonia and/or the primary amine only is used.

* * * * *